(12) United States Patent
Guenther

(10) Patent No.: US 7,445,444 B2
(45) Date of Patent: Nov. 4, 2008

(54) INSERT FOR AN INJECTION MOLDING APPARATUS

(75) Inventor: Hans Guenther, Georgetown (CA)

(73) Assignee: Mold-Masters (2007) Limited, Georgetown, Ontario (CA)

(*) Notice: Subject to any disclaimer, the term of this patent is extended or adjusted under 35 U.S.C. 154(b) by 206 days.

(21) Appl. No.: 11/339,957

(22) Filed: Jan. 26, 2006

(65) Prior Publication Data

US 2007/0172537 A1    Jul. 26, 2007

(51) Int. Cl.
*B29C 45/22* (2006.01)
(52) U.S. Cl. .............. 425/564; 425/566; 425/572
(58) Field of Classification Search ............. 425/562, 425/563, 564, 565, 566, 572
See application file for complete search history.

(56) References Cited

U.S. PATENT DOCUMENTS

| | | |
|---|---|---|
| 4,333,629 A | 6/1982 | Roy |
| 4,690,437 A | 9/1987 | Anderson |
| 5,441,197 A | 8/1995 | Gellert et al. |
| 6,007,108 A | 12/1999 | Braun |
| 7,025,585 B2 * | 4/2006 | Gellert ............... 425/564 |

FOREIGN PATENT DOCUMENTS

| | | |
|---|---|---|
| DE | 2160535 | 6/1973 |
| DE | 32 11 342 A1 | 9/1983 |
| EP | 0 226 798 B1 | 7/1987 |
| EP | 0 523 549 A2 | 1/1993 |
| EP | 0 630 733 B1 | 12/1994 |

* cited by examiner

*Primary Examiner*—Tim Heitbrink
(74) *Attorney, Agent, or Firm*—Medler Ferro PLLC

(57) ABSTRACT

An injection molding hot runner apparatus and insert assembly for use in a manifold of the apparatus. The apparatus includes a mold manifold, a cylindrical insert for redirecting melt within the mold manifold, and an expandable sleeve surrounding the insert. When the manifold, insert and sleeve are heated to an operational temperature (e.g. 300° C.), the sleeve expands to create a fluid tight seal between the manifold and the insert. The insert assembly including the insert and sleeve is mountable in the mold manifold to redirect melt.

25 Claims, 4 Drawing Sheets

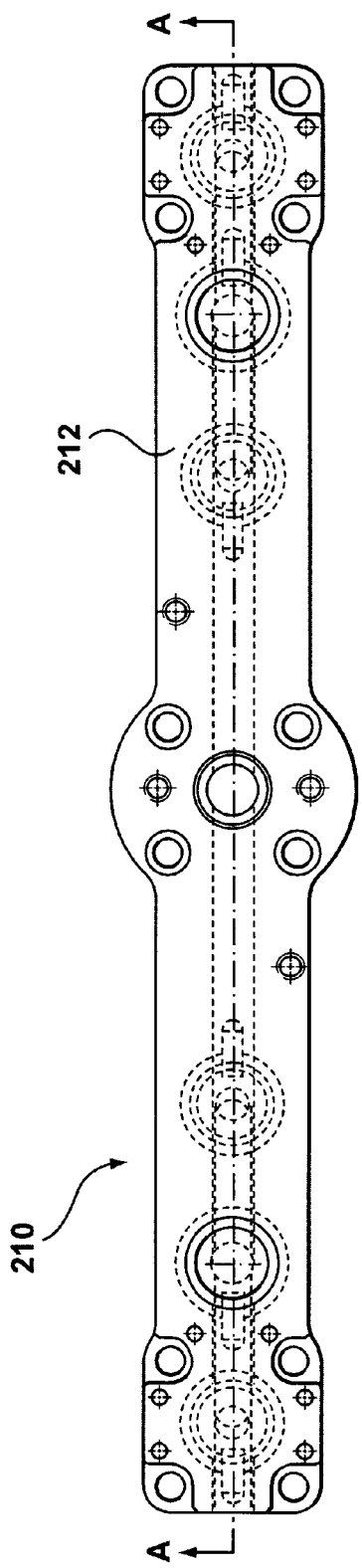
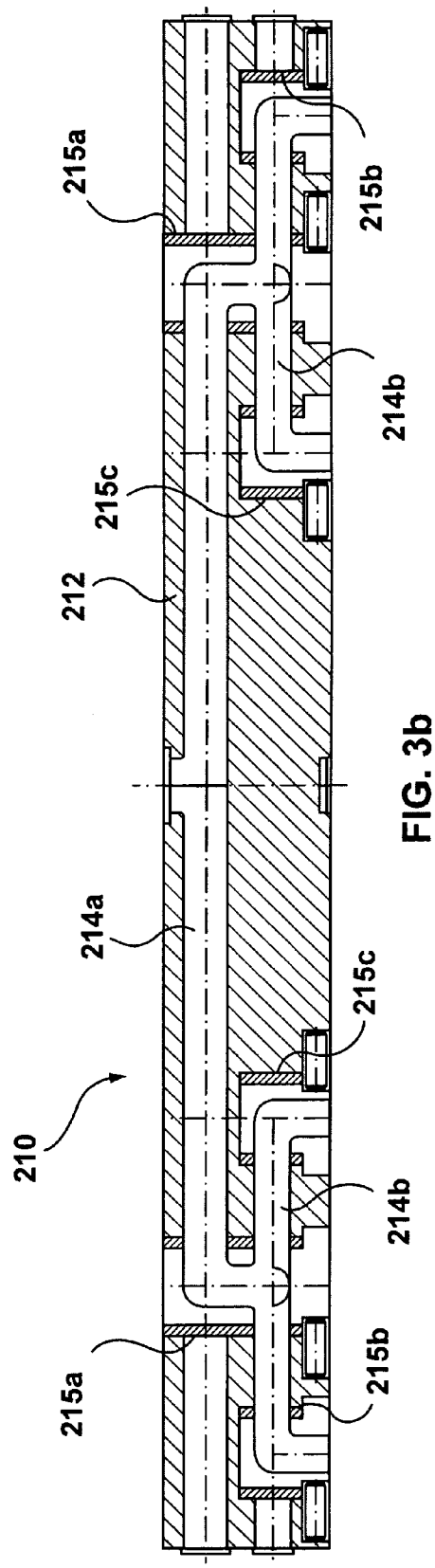
FIG. 3a
FIG. 3b

INSERT FOR AN INJECTION MOLDING APPARATUS

FIELD OF THE INVENTION

The present invention relates to injection molding apparatus and more particularly to a hot runner melt distribution manifold and an insert or plug seated in the manifold for redirecting melt.

BACKGROUND OF THE INVENTION

Injection molding apparatus often include a hot runner system with a heated melt manifold. A typical method for producing a hot runner manifold is to gun drill the manifold melt channels through a solid piece of steel, machine cylindrical bores to intersect the channels, and install inserts or plugs into bores to split or redirect the manifold melt channels within the manifold or redirect the channels towards nozzle melt channels. Normally, the insert is press-fitted into the bore; however, the insert can also be brazed to the bore, or the bore and insert can be machined with mating threads so that they can be attached. The insert has a melt duct with an inlet in fluid communication with an upstream manifold melt channel and an outlet in fluid communication with a downstream manifold melt channel or nozzle melt channel. The melt duct in the insert has a generally 90° bend to redirect the melt stream.

A potential problem with the use of an insert is the risk of leakage of melt into the manifold at a junction between the duct of the insert and manifold melt channel during operation of the injection molding apparatus. This may be due to damage to the insert or corresponding bore during assembly or an imperfect fit between the insert and bore due to manufacturing errors attributable to normal machining tolerances. To minimize the risk of leakage, the insert and manifold bore in which it is seated must be machined to very strict tolerances to achieve a fluid-tight fit at operating pressures and temperatures. This precise grinding of the outer surface of the insert and the inner surface of the bore adds to manufacturing costs, and frequently results in an insert that cannot be later removed from the manifold once it is mounted.

While prior structures have proven to be satisfactory in many respects, there is still a need for more commercially advantageous structures for preventing leaks in the manifold. The present invention is intended to meet this need.

SUMMARY OF THE INVENTION

The invention provides an injection molding apparatus having a manifold having an inlet and at least one melt channel in fluid communication with the inlet, a cylindrical bore in the manifold intersecting the melt channel, an expandable cylindrical sleeve co-axial with and seated in the bore, the sleeve having a sleeve opening in communication with the melt channel, and a cylindrical insert co-axial with and seated in the sleeve, the insert defining a melt duct with an insert inlet opening in fluid communication with the sleeve opening and an insert outlet opening opposite the insert inlet opening, wherein the outer diameter of the insert, thickness of the sleeve, inner diameter of the cylindrical bore, and material of the insert, sleeve and manifold, are each selected such that when the manifold, sleeve and insert are heated to an operational temperature, the sleeve expands to create a fluid tight seal between the manifold and the insert.

The sleeve may have a coefficient of expansion and a thickness selected such that when the manifold, insert and sleeve are heated to an operational temperature, the sleeve expands to create a fluid tight seal between the manifold and the insert. The sleeve may expand more than at least one of the insert and the manifold in relative and/or absolute terms.

According to another aspect, the invention provides an injection molding insert assembly for redirecting melt from a manifold melt channel comprising the expandable cylindrical sleeve and the cylindrical insert co-axial with and seated in the sleeve.

BRIEF DESCRIPTION OF THE DRAWINGS

To facilitate a better understanding of the invention, embodiments of the invention will now be described with reference to the drawings.

FIG. 3a is a top view of a multi-cavity injection molding apparatus according to a second embodiment of the invention having a plurality of inserts for redirecting melt to downstream manifold melt channels and nozzle melt channels, and expandable sleeves surrounding the inserts.

FIG. 3b is a side sectional view of the apparatus of FIG. 3a taken along line A-A of FIG. 3a.

DETAILED DESCRIPTION OF THE INVENTION

When used herein, "coefficient of expansion" means the linear thermal expansion coefficient of a material. It is the fractional change in length of a bar per degree of temperature change and is measured in parts per million per Celsius degree. Thus, this term is used to measure the degree of expansion or contraction of a material due to temperature change. Some values for common materials are listed below:

| | |
|---|---|
| Aluminum | 23 ($\times 10^{-6}$/° C.) |
| Brass | 19 |
| Stainless Steel | 17.3 |
| Copper | 17 |
| Gold | 14 |
| Iron | 12 |
| Carbon Steel | 10.8 |
| Platinum | 9 |
| Tungsten | 4.5 |
| Silicon | 3 |

Figure 1:
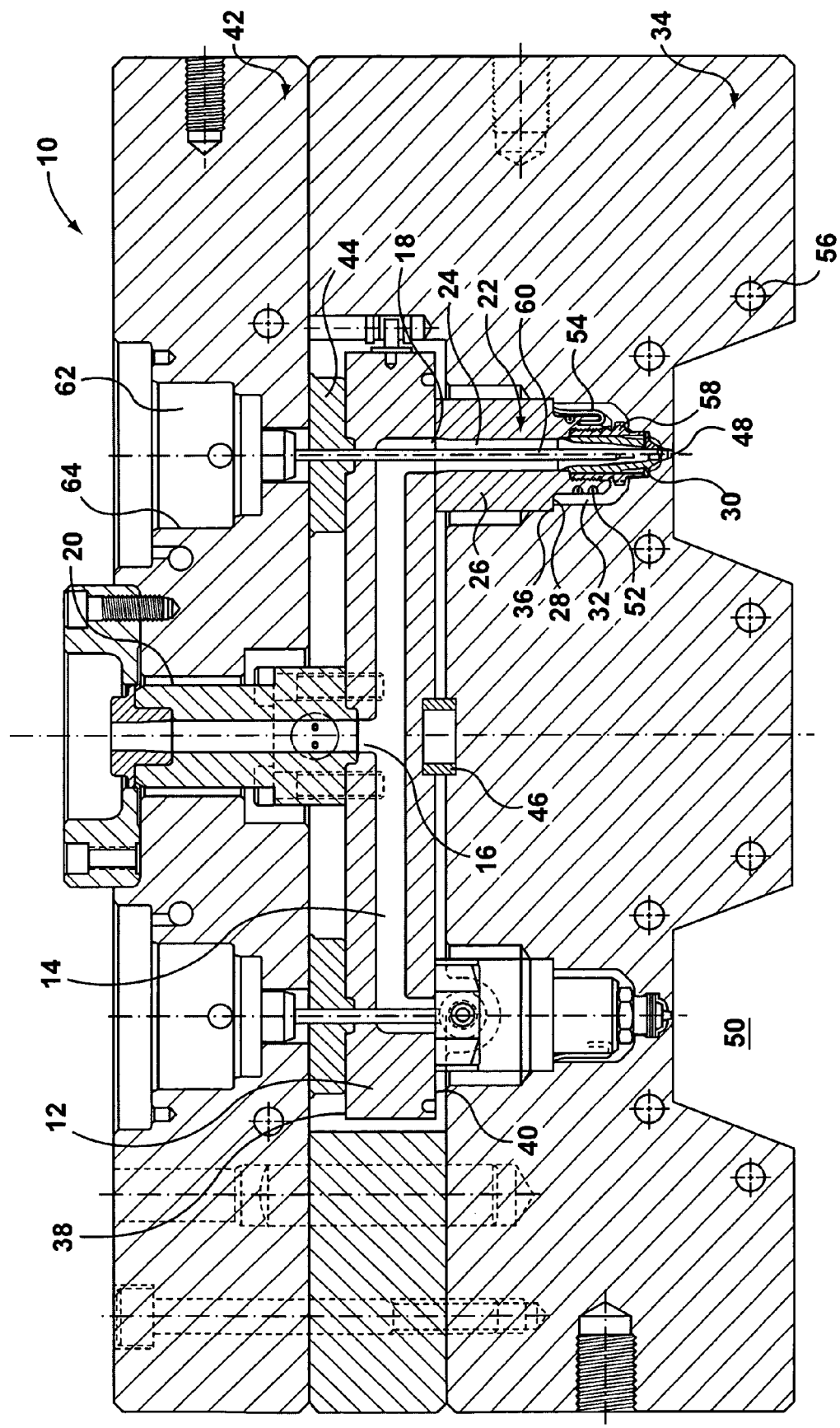
FIG. 1 is a partial sectional view of a prior art multi-cavity injection molding apparatus.

Referring now to FIG. 1, a prior art injection molding apparatus 10 is generally shown. Injection molding apparatus 10 includes a manifold 12 having a manifold melt channel 14. Manifold melt channel 14 extends from an inlet 16 to manifold outlets 18. Inlet 16 of manifold melt channel 14 receives a melt stream of moldable material from a machine nozzle (not shown) through a sprue bushing 20 and delivers the melt to hot runner nozzles 22, which are in fluid communication with respective manifold outlets 18. Although a pair of hot runner nozzles 22 is shown in FIG. 1, it will be appreciated that a typical injection molding apparatus may include only one or a plurality of hot runner nozzles for receiving melt from respective manifold outlets.

Each hot runner nozzle 22 is received in an opening 32 in a mold plate 34. A nozzle head 26 of the hot runner nozzle 22 includes lower surface 28. The lower surface 28 abuts a step 36, which is provided in opening 32 to maintain nozzle head 26 in abutment with a lower surface 40 of manifold 12. A nozzle tip 30 is received in a downstream end of hot runner nozzle 22. The nozzle tip 30 is coupled to the hot runner nozzle 22 by a transfer seal 58. The transfer seal 58 is threaded to the hot runner nozzle 22. A nozzle melt channel 24 extends through hot runner nozzle 22 and nozzle tip 30. Nozzle melt channel 24 is in communication with manifold outlet 18 to receive melt from manifold channel 14. Hot runner nozzle 22 is heated by a heater 52 and further includes a thermocouple 54.

A valve pin 60 extends through nozzle melt channel 24 and is slidable through a valve pin bushing 44, which is provided between manifold 12 and back plate 42. The valve pin 60 is axially movable by an actuator 62 to selectively engage a mold gate 48. The actuator 62 is received in an opening 64 in back plate 42 and may be hydraulic, pneumatic or any other suitable type. A locating ring 46 maintains manifold 12 in position relative to mold plate 34.

Mold cavities 50 are provided between mold cavity plate 34 and a mold core (not shown). Mold cavities 50 receive melt from nozzle melt channels 24 through mold gates 48. Cooling channels 56 extend through mold plate 34 to cool the mold cavities 50.

In operation, melt is injected from the machine nozzle into manifold channel 14 of manifold 12 through sprue bushing 20. Nozzle melt channels 24 of nozzles 22 receive melt from manifold outlets 18 and deliver the melt to mold cavities 50 through the mold gates 48. Once the mold cavities 50 have been filled with melt, the melt is cooled and the molded parts are ejected from injection molding apparatus 10.

Figure 2:
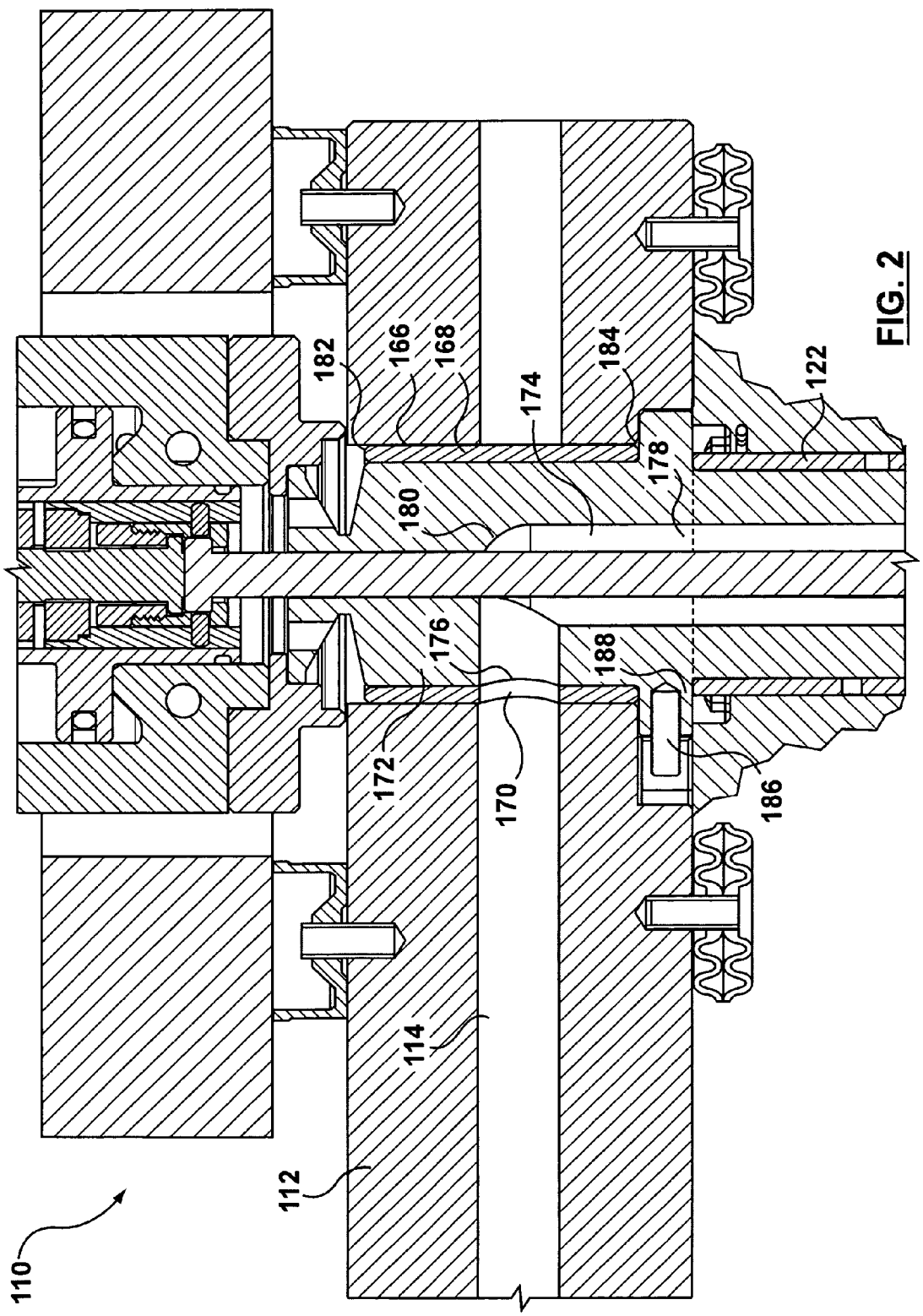
FIG. 2 is a partial sectional view of a multi-cavity injection molding apparatus according to a first embodiment of the invention having an insert for redirecting melt to a downstream nozzle melt channel, and an expandable sleeve surrounding the insert.

The prior art apparatus described above can be modified to include a sleeve and insert as shown in FIG. 2. With reference to FIG. 2, wherein like reference numerals in the 100 series are used to refer to like parts, a multi-cavity injection molding apparatus 110 comprises a manifold 112 having a longitudinally extending inlet (not shown) and at least one transversely extending manifold melt channel 114 in fluid communication with the inlet. The manifold 112 includes a longitudinally extending cylindrical bore 166 intersecting the melt channel 114. An expandable cylindrical sleeve 168 (which will be described in more detail below) is seated in the bore 166 and has a sleeve opening 170 in communication with the melt channel 114. A cylindrical insert 172 is co-axial with and seated in the sleeve 168 for redirecting melt from the melt channel 114 to the melt channel of a valve-gated hot runner nozzle 122. The insert 172 has an insert inlet opening 176 in fluid communication with the sleeve opening 170 and an insert outlet opening 178 opposite the insert inlet opening 176. A melt duct 174 extends between the inlet and outlet openings 176, 178 to redirect melt from the inlet opening 176 to the outlet opening 178. In this embodiment, the melt duct 174 includes a 90° bend 180 such that melt flowing transversely into the insert 172 from the melt channel 114 is redirected to flow longitudinally into the nozzle 122.

To assemble the apparatus 110, the sleeve 168 is press fitted over the insert 172, with the sleeve opening 170 in alignment with the insert inlet opening 176. The insert 172 and sleeve 168 are then inserted into the cylindrical bore 166 of the manifold 112 while aligning a dowel 186 of the manifold with a corresponding complementary receiver 188 in the insert 172, as is known in the art (see, for example, EP 0 630 733 B1 which discloses alignment structures which may be used in the context of the present invention), thereby aligning the sleeve opening 170 and insert inlet opening 176 with the transversely extending portion of the melt channel 114 such that melt flowing through the melt channel 114 will enter the insert 172 through the sleeve opening 170 and insert inlet opening 176 and be redirected at 90° towards the nozzle 122 through the insert outlet opening 178. The nozzle 122 and remainder of the injection molding apparatus 110 is assembled in accordance with known methods.

The sleeve 168, manifold 112 and insert 172 materials, and the outer diameter of the insert 172, thickness of the sleeve 168, and inner diameter of the cylindrical bore 166 are selected such that the components fit together in a press fit near room temperature (21° C.) during assembly. Furthermore, these variables are chosen such that, during operation of the injection molding apparatus 110, when the manifold 112, sleeve 168 and insert 172 are heated to an operational temperature of 300° C. and subjected to pressures up to about 20,000 psi, the sleeve 168 expands to create a fluid tight seal between the manifold 112 and the insert 172, thereby preventing leakage of melt into the manifold.

In this embodiment, the sleeve 168 has a thickness of 5 mm±0.01 (to account for typical machine tolerances) and is made of a copper based alloy, for example beryllium copper The insert and manifold are both made of steel, for example $17/_8$ stainless steel, although many other types known in the art can also be used. The inner diameter of the cylindrical bore 166 in the manifold 112 is just over 40 mm±0.01 mm (to account for typical machine tolerances) and the insert 172 has an outer diameter of just under 30 mm±0.01 mm (to account for typical machine tolerances).

At an operational temperature of 300° C., the manifold 112 expands such that the cylindrical bore 166 shrinks transversely by about 0.16 mm. At the same time, the insert 172 expands transversely by about 0.24 mm and the thickness of the sleeve expands. The sleeve 168 therefore expands linearly at least 50% more than each of the manifold 112 and the insert 172. Thus, in this embodiment, the thickness of the sleeve expands more in absolute terms, than both the insert and manifold.

According to another measure, the coefficient of expansion of the sleeve is 0.000018 mm/mm, which is greater than the coefficient of expansion of both the manifold 112 and the insert 172 which is 0.000012 mm/mm. According to yet another measure, the sleeve 168 expands about 0.000018 mm per millimeter of thickness of the sleeve 168 per degree Celsius increase in temperature. In contrast, the manifold 112 and insert 172 each expands at a rate of about 0.000012 mm per mm thickness (measured along a transverse axis) of the manifold 112 and insert 172 per degree Celsius increase in temperature. Thus, in the embodiment, the sleeve 168 also expands more, in relative terms, than both the insert 172 and the manifold 112.

The afore-described apparatus 110 utilizes an insert assembly consisting of a sleeve with an insert seated therein for redirecting melt towards the melt channel of a nozzle. However, the insert assembly may be positioned anywhere within the mold manifold where it is desired to redirect melt. For example, the insert assembly may be configured to split and redirect melt to a downstream manifold melt channel, as shown in FIGS. 3a, 3b and 3c.

Figure 3C:
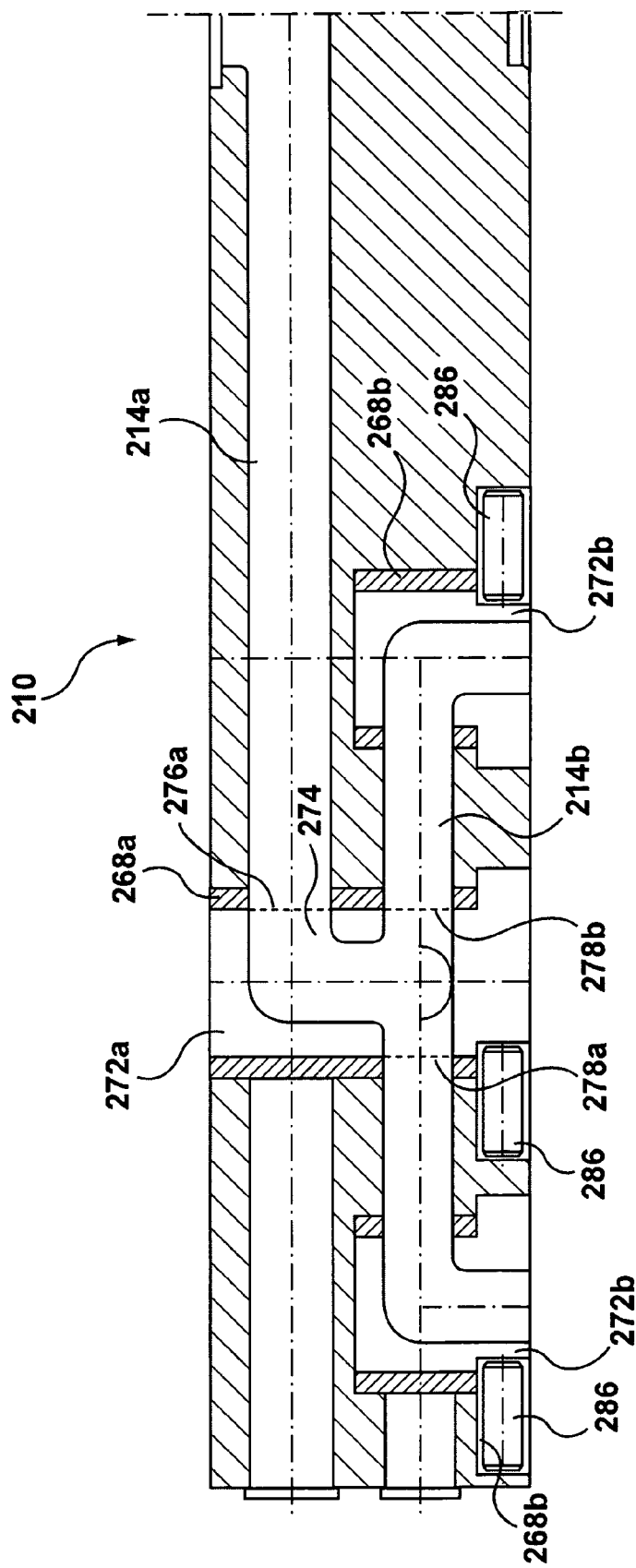
FIG. 3c is an enlarged view of one half of the apparatus shown in FIG. 3b, which half is a mirror image of the other half.

Referring now to FIGS. 3a, 3b and 3c, wherein like reference numerals in the 200 series are used to denote like parts, a multi-cavity injection molding apparatus 210 according to a second embodiment of the invention is shown and comprises a manifold 212 which has been gun drilled to provide an upstream manifold melt channel 214a and a downstream manifold melt channel 214b spaced from and parallel to the upstream manifold melt channel 214a. Cylindrical bores 266a, 266b, and 266c have been machined to intersect the channels 214a, 214b, as is known in the art. Insert assemblies are inserted in the bores 266a, 266b, and 266c to split or redirect the manifold melt channel 214a within the manifold and to redirect the manifold melt channel 214b towards nozzle melt channels as will be described further with reference to FIG. 3c. As can be seen in FIGS. 3a and 3b, the apparatus 210 consists of two halves that are mirror images of each other. FIG. 3c shows one of the halves and the description of this half will be understood to apply equally to the other half.

Referring to FIG. 3c, the apparatus 210 includes an upstream insert 272a and an upstream sleeve 268a for redirecting melt from the upstream manifold melt channel 214a towards the downstream manifold melt channel 214b. As in the case of the first described embodiment, the insert 272a has an insert inlet opening 276a through which melt from the upstream manifold channel 214a flows into the insert 272a. However, unlike the first described embodiment, the insert 272a has a pair of opposed insert outlet openings 278a and 278b located downstream of the insert inlet opening 276a. The insert 272a defines a bifurcated melt duct 274 extending between the insert inlet and outlet openings 276a, 278a, and 278b which splits the melt flowing therethrough into two streams which enter the downstream melt channel 214b. Melt flowing in the downstream melt channel 214b is further redirected by insert assemblies consisting of inserts 272b and sleeves 268b towards thermal gated injection molding nozzles (not shown).

While the lengths of the insert assemblies vary (as shown in FIGS. 3a, 3b and 3c), the manifold 212, inserts 272a, 272b, sleeves 268a, 268b, and cylindrical bores 266a, 266b and 266c are similar in terms of materials, sleeve thickness, and internal and external diameters as corresponding components of the first embodiment described above. The insert assemblies are also assembled within the manifold in a similar fashion with alignment with the manifold melt channels 214a, 214b being achieved using dowels 286 which mate with corresponding receivers in the inserts 272a, 272b.

It will be appreciated that numerous variations to the above described embodiments are possible. The dimensions and materials of the insert, sleeve, cylindrical bore and manifold will vary with the particular application. The sleeve should be in engagement with both the insert and the manifold when the components are assembled. The components can be dimensioned such that the sleeve can slidably receive the insert in a press fit when the sleeve and insert are at the same temperature (e.g. room temperature of 21° C. during assembly). Alternatively, the sleeve may be dimensioned to slidably receive the insert in a press fit when the temperature of the insert is lower than the temperature of the sleeve, such as when the insert is cooled relative to the sleeve or when the sleeve is heated relative to the insert. Similarly, the sleeve may be dimensioned to engage the bore in a press fit when the temperature of the sleeve is lower than the temperature of the manifold such as when the sleeve is cooled relative to the manifold.

The sleeve may be made to varying thicknesses, including without limitation, from about 1 to about 30 mm±typical machine tolerances (e.g. ±0.01 mm), depending on the size of the bore and the outer diameter of the insert.

The components should be made of materials that will expand such that a fluid tight seal is provided between the manifold and the insert during operation of the apparatus. It is desirable to employ a material for the sleeve that has a high hardness value, a relatively high yield point (to resist plastic deformation), a high heat expansion coefficient and which does not anneal at elevated operational temperatures Suitable materials include but are not limited to alloys of steel, copper, silver, and aluminum.

The sleeve may be made of a material which expands, in absolute terms, more than the amount of expansion of at least one neighboring component. For example, the sleeve may expand, in absolute terms, at least 10%, 20%, 30%, 40%, 50%, 60%, 70% and 80% more than the expansion of at least one of the manifold and the insert.

In other embodiments, the sleeve may be made of a material that expands more, in relative terms, than the material of at least one neighboring component. For example, the sleeve may have a coefficient of expansion that is greater than the coefficient of expansion of the material of at least one of the insert and manifold. Similarly, the sleeve may expand more, in terms of mm per mm thickness per degree ° C. increase in temperature, than at least one of the manifold and insert.

The operational temperature of the apparatus may also vary depending upon the particular application and will typically be from about 150 to 400° C.

While the melt duct of the inserts described and shown have a generally 90° bend, it will be appreciated that the melt duct may have any shape and configuration suitable for redirecting or splitting melt within a mold manifold.

It will be further appreciated that the insert assembly can be assembled within the manifold in different ways and that the apparatus can employ alternative nozzles such as edge-gated nozzles. The nozzles may also be attached to the manifold in different ways, as would be apparent to the person skilled in the art.

The above description of embodiments is given by way of example only and shall not be construed to limit the scope of the invention as defined by the following claims.

The invention claimed is:

1. An injection molding apparatus comprising:
 a manifold having an inlet and at least one melt channel in fluid communication with the inlet;
 a cylindrical bore in the manifold intersecting the melt channel;
 an expandable cylindrical sleeve co-axial with and seated in the cylindrical bore, the sleeve having a sleeve opening in communication with the melt channel; and
 a cylindrical insert co-axial with and seated in the sleeve, the insert defining a melt duct with an insert inlet opening in fluid communication with the sleeve opening and an insert outlet opening opposite the insert inlet opening;
 wherein the sleeve has a coefficient of expansion and a thickness selected such that when the manifold, insert and sleeve are heated to an operational temperature, the sleeve expands to create a fluid tight seal between the manifold and the insert.

2. The apparatus of claim 1, wherein the coefficient of expansion of the sleeve is greater than the coefficient of expansion of at least one of the manifold and the insert.

3. The apparatus of claim 2, wherein the coefficient of expansion of the sleeve is greater than the coefficient of expansion of both the manifold and the insert.

4. The apparatus of claim 1, wherein the sleeve expands more, in absolute terms, than at least one of the manifold and the insert.

5. The apparatus of claim 4, wherein the sleeve expands at least 10% more, in absolute terms, than at least one of the manifold and the insert.

6. The apparatus of claim 5, wherein the sleeve expands at least 40% more, in absolute terms, than at least one of the manifold and the insert.

7. The apparatus of claim 1, wherein the operational temperature is about 150° C. or greater.

8. The apparatus of claim 7, wherein the operational temperature is about 300° C. or greater.

9. The apparatus of claim 1, wherein the sleeve is dimensioned to slidably receive the insert in a press fit when the sleeve and insert are at the same temperature.

10. The apparatus of claim 1, wherein the sleeve is dimensioned to slidably receive the insert in a press fit when the temperature of the insert is lower than the temperature of the sleeve.

11. The apparatus of claim 1, wherein the sleeve is dimensioned to engage the bore in a press fit when the sleeve and manifold are at the same temperature.

12. The apparatus of claim 1, wherein the sleeve is dimensioned to engage the bore in a press fit when the temperature of the sleeve is lower than the temperature of the manifold.

13. The apparatus of claim 1, wherein the sleeve is made of a material chosen from the group comprising alloys of stainless steel, beryllium, copper, silver, and aluminum.

14. The apparatus of claim 13, wherein the material is chosen from copper, aluminum and stainless steel alloys.

15. The apparatus of claim 1, wherein the thickness of the sleeve expands more than 0.0017 mm per mm of thickness of the sleeve per degree ° C. increase in temperature.

16. An injection molding insert assembly for redirecting melt from a manifold melt channel comprising:
   an expandable cylindrical sleeve having a sleeve opening in a wall thereof in fluid communication with the manifold melt channel; and
   a cylindrical insert coaxial with and press fit within the sleeve, the insert defining a melt duct with an insert inlet opening in fluid communication with the sleeve opening for receiving the melt from the manifold melt channel and an insert outlet opening at an opposite end of the melt duct from the insert inlet opening;
   wherein the sleeve is of a material that has a first coefficient of expansion and the insert is of a material that has a second coefficient of expansion.

17. The insert assembly of claim 16, wherein the first coefficient of expansion of the sleeve material is greater than the second coefficient of expansion of the insert material.

18. The insert assembly of claim 17, wherein the sleeve expands more, in absolute terms, than the insert.

19. The insert assembly of claim 18, wherein the sleeve expands at least 10% more, in absolute terms, than the insert.

20. The insert assembly of claim 18, wherein the sleeve expands at least 40% more, in absolute terms, than the insert.

21. The insert assembly of claim 16, wherein the sleeve is dimensioned to slidably receive the insert in the press fit when the sleeve and insert are at the same temperature.

22. The insert assembly of claim 16, wherein the sleeve is dimensioned to slidably receive the insert in the press fit when the temperature of the insert is lower than the temperature of the sleeve.

23. The insert assembly of claim 16, wherein the sleeve is made of a material chosen from the group comprising alloys of stainless steel, beryllium, copper, silver, and aluminum.

24. The insert assembly of claim 16, wherein the thickness of the sleeve expands more than 0.0017 mm per mm of thickness of the sleeve per degree ° C. increase in temperature.

25. An injection molding apparatus comprising:
   a manifold having an inlet and at least one melt channel in fluid communication with the inlet;
   a cylindrical bore in the manifold intersecting the melt channel;
   an expandable cylindrical sleeve co-axial with and seated in the bore, the sleeve having a sleeve opening in communication with the melt channel; and
   a cylindrical insert co-axial with and seated in the sleeve, the insert defining a melt duct with an insert inlet opening in fluid communication with the sleeve opening and an insert outlet opening opposite the insert inlet opening;
   wherein the outer diameter of the insert, thickness of the sleeve, inner diameter of the cylindrical bore, and material of the insert, sleeve and manifold, are each selected such that when the manifold, sleeve and insert are heated to an operational temperature, the sleeve expands to create a fluid tight seal between the manifold and the insert.

* * * * *